United States Patent [19]

Freeman

[11] Patent Number: 4,808,362
[45] Date of Patent: Feb. 28, 1989

[54] HOLLOW REINFORCED FIBER STRUCTURE FORMED BY RESIN TRANSFER MOLDING

[75] Inventor: Richard B. Freeman, Wilmington, Del.

[73] Assignee: The Budd Company, Troy, Mich.

[21] Appl. No.: 58,106

[22] Filed: Jun. 4, 1987

[51] Int. Cl.⁴ .................................. B29C 43/18
[52] U.S. Cl. .............................. 264/257; 264/40.5; 264/102; 264/314; 264/328.7; 425/417
[58] Field of Search .............. 264/313, 314, 317, 257, 264/258, 101, 102, 328.7, 40.3, 40.5; 425/112, 116, 129 R, 128, 389, 390, 417; 249/65, 82; 156/285, 286, 381, 382

[56] References Cited

U.S. PATENT DOCUMENTS

| | | |
|---|---|---|
| 2,711,985 | 6/1955 | Olson .................... 264/314 |
| 2,975,476 | 3/1961 | Burke .................... 264/314 |
| 3,135,640 | 6/1964 | Kepka .................... 264/314 |
| 3,879,160 | 4/1975 | Miller .................... 249/65 |
| 4,123,494 | 10/1978 | Evrand et al. ............ 264/328.7 |
| 4,148,597 | 4/1979 | Larson ................... 264/314 |
| 4,312,829 | 1/1982 | Fourcher ................. 264/313 |
| 4,647,327 | 3/1987 | Rose ..................... 156/382 |

FOREIGN PATENT DOCUMENTS 0205126 12/1982 Japan ..................... 264/313

Primary Examiner—James Lowe
Assistant Examiner—Jeremiah F. Durkin
Attorney, Agent, or Firm—E. M. Farrell; Herman Foster; T. I. Davenport

[57] ABSTRACT

A method of forming a hollow reinforced fiber structure includes the steps of providing fiber reinforced material around a flexible expandable member and placing the resulting package inside of a mold which includes inner surfaces conforming to the shape of the structure being formed. A second expandable means is included in the mold on both sides of the package. After the mold is closed, pressure is applied to force the second expandable means against the fiber reinforced material. Resin is injected into the fiber reinforced material. The pressure is then decreased in the second expandable means as inflatable member is expanded to force the fiber material to conform to the inner surfaces of the mold. The fiber material is then cured to form the structure.

10 Claims, 5 Drawing Sheets

FIG. 1
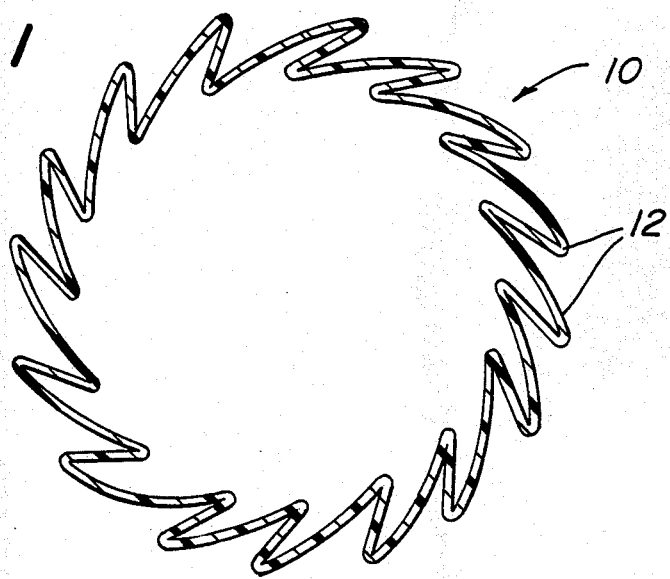
FIG. 2
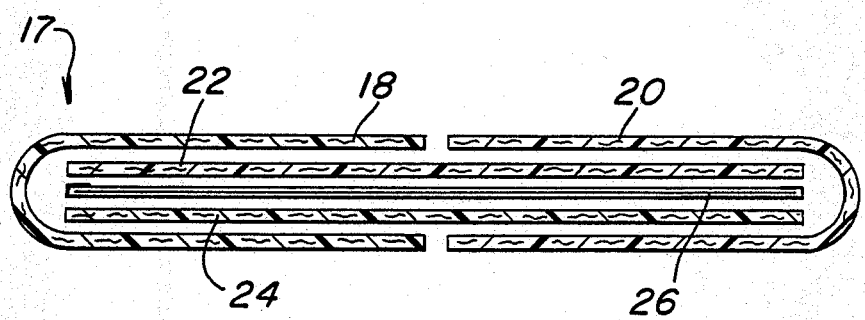
FIG. 3

HOLLOW REINFORCED FIBER STRUCTURE FORMED BY RESIN TRANSFER MOLDING

BACKGROUND OF THE INVENTION

Resin transfer molding (RTM) has been used in forming fiber reinforced structures. When hollow structures are formed, inflatable bladders have been used as inner mold pieces.

A co-pending application to Freeman entitled "Perimeter Resin Feeding of Composite Structures", Ser. No. 06/833,304, filed 2-26-86, now U.S. Pat. No. 4,740,346 uses resin transfer molding (RTM). This application relates to the general subject matter of the present invention. Other patents relating to the subject matter of the invention include U.S. Pat. Nos. 4,017,572; 3,937,781; 4,473,520 and 4,269,890. The present invention differs from these patents and other prior art by a method involving injecting resin into fiber material and then using flexible means on both sides as the fiber is moved into the shape of the article being formed.

Different methods using RTM and inflatable bladder as an inner mold have generally involved multiple pieces to make the bladders nd involved steps in the process which limited the system to producing a limited number of parts within a given time span. The present invention involves an oversize bladder where stretching is minimized and the shape of the bladder is not critical.

OBJECTS OF THE INVENTION

It is an object of this invention to provide an improved method of forming a hollow fiber reinforced structure.

It is a further object of this invention to provide an improved inflatable member for use in a resin transfer molding system to form a hollow fiber reinforced structure.

It is still a further object of this invention to provide an improved resin transfer molding system using oversize bladders as an inner mold to form a hollow fiber structure.

BRIEF SUMMARY OF THE INVENTION

In accordance with the present invention, a method of forming a hollow reinforced fiber structure includes the steps of placing an oversize member inside fiber reinforced material and then putting them inside of a two piece mold which has inner surfaces conforming to the fiber structure to be formed. The mold includes flexible means, such as one or more pre-placed expandable sheets. After the mold is closed, pressure is applied to force the expandable sheets against the fiber reinforced material and resin is then injected into the fiber reinforced material. Pressure on the expandable sheets is then decreased as pressure is simultaneously applied to the oversize inflatable member and force the fiber reinforced material against the inner walls of the mold. After curing the hollow fiber structure is formed.

Other objects and advantages of the present invention will be apparent and suggest themselves to those skilled in the art, from a reading of the following specification and claims, taken in conjunction with the accompanying drawings.

BRIEF DESCRIPTION OF THE DRAWINGS

FIGS. 1 and 2 illustrate cross-sectional shapes of two oversize inflatable members, of the type which may be used with the present invention;

FIG. 3 is a cross-sectional view of an inflatable member inside of fiber reinforced material;

DESCRIPTION OF THE INVENTION

Figure 4:
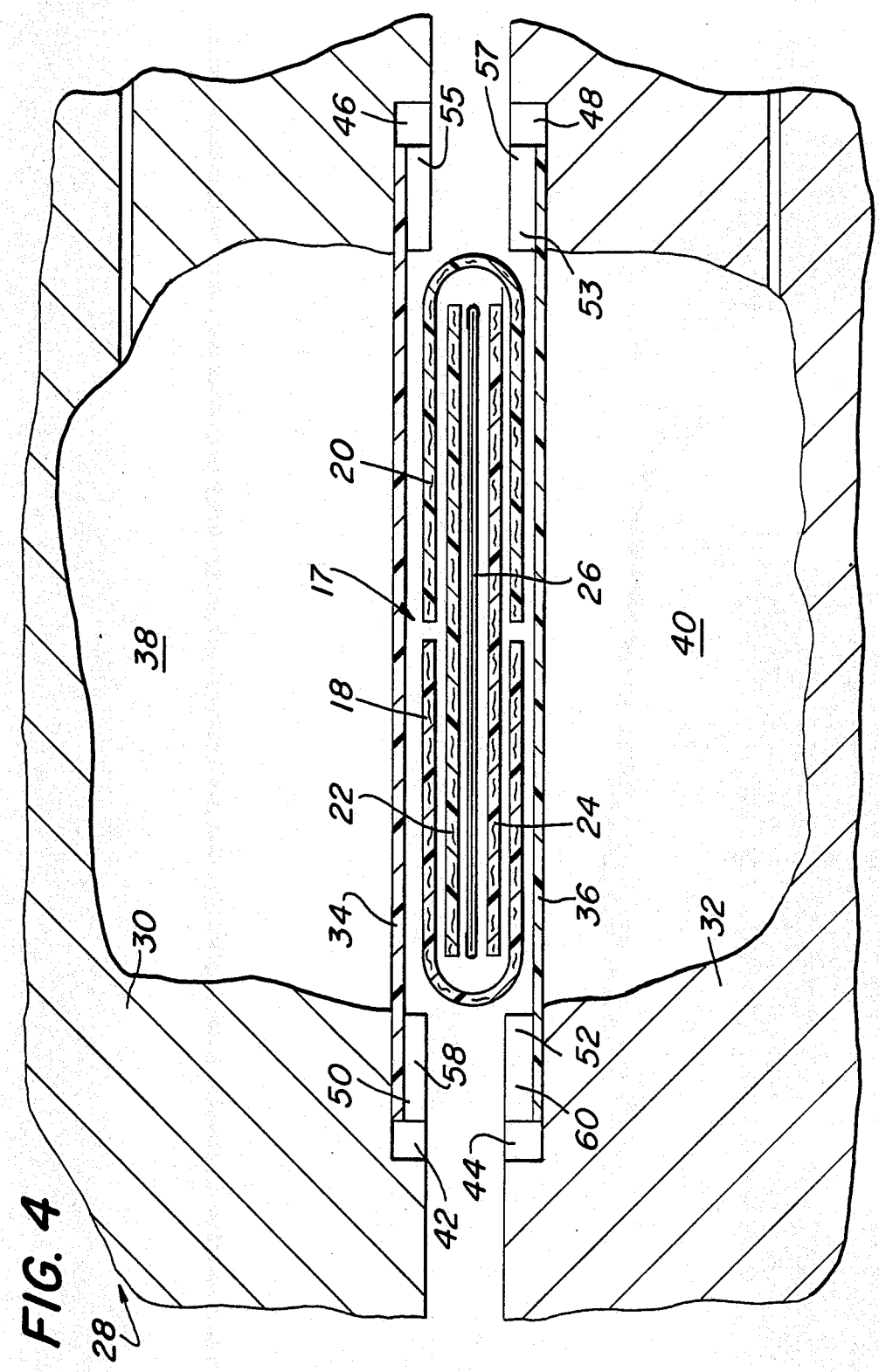
FIG. 4 illustrates the assembly illustrated in FIG. 3 inside of an open two-piece mold, in accordance with one embodiment of the present invention.

Referring to FIG. 1 a flexible member or bladder 10, which may be plastic or rubber, is adapted to be inflated by a suitable gas, such as air. The bladder includes a plurality of corrugation-like portions 12. The bladder 10 is in a flat condition before it is inflated and placed inside of a mold. There is no need to precisely hand fit the bladder to the inner shape of the mold because excess material provided by the corrugations 12 required to fit the perimeter of the bladder to the cavity in the mold after inflation will come from the folds 12 in the bladder 10. The inflation steps of the bladder will be subsequently described in connection with FIGS. 4 to 7.

Referring to FIG. 2 another embodiment of a bladder includes a bladder 14 including two folds therein 16. Of course more or less than two folds may be used. The bladder 14 is designed to be put into a mold in a flat condition. Preforming the bladder 14 to the shape of the mold is not required. The folds 16 provides excessive material for the bladder 14 to permit it to expand into cavities of a mold.

The bladders 10 and 14 may be considered as oversized, inflatable members. Various other forms of the bladder may be involved wherein excessive material is provided to permit expansion of the bladder into irregular shaped cavities of a mold without excessively stretching the material in the bladder when it is inflated.

Referring to FIG. 3, four pieces of fiber reinforced material 18, 20, 22 and 24 are provided. The multiple pieces of fiber material are provided so that the material may move within a cavity of a mold without the need to preform the fiber material to the shape of the mold. More or less than four fiber pieces may be used. An inflatable member or bladder 26 is disposed between the inner pieces 22 and 24. The bladder 26, which comprises an oversized bladder, which may be one of the types illustrated in FIG. 1, is placed within the fiber material in a flat position. The package 17 illustrated in FIG. 3 is ready to be placed into an open mold as illustrated in FIG. 4.

Referring to FIG. 4 the package or assembly 17 is placed inside an open mold 28 including an upper mold piece 30 and lower mold piece 32. Expandible flexible means include a pair of sheets 34 and 36 which may be silicon or other suitable material. The sheets 34 and 36 are secured to the mold pieces 30 and 32, respectively, at the edges of cavities 38 and 40. The piece 34 covers the upper cavity 38 and the piece 36 covers the lower cavity 40. The cavities 38 and 40 are shaped to the fiber hollow structure to be formed.

A pair of fill channels or grooves 42 and 44 receive resin to impregnate the pieces of fiber in the mold. Grooves or channels 46 and 48 provided in the upper and lower mold pieces 30 and 32 provide vents for the air the resin is applied to the fiber material. This arrangement is disclosed in the aforementioned co-pending application.

Hold-down elements 50 and 52 for the pieces 34 and 36 are provided. The hold-down element 50 and 52 include cut-out portions 58 and 60 therein to provide one or more openings in the hold-down elements to permit injection of the resin from the channels 42 and 44 into the fiber material.

Hold-down elements 51 and 53 are provided to hold down the elements 34 and 36. Cut-out portions 55 and 57 provide an opening therebetween when the mold pieces are closed to permit air to vent into channels 46 and 48.

Figure 5:
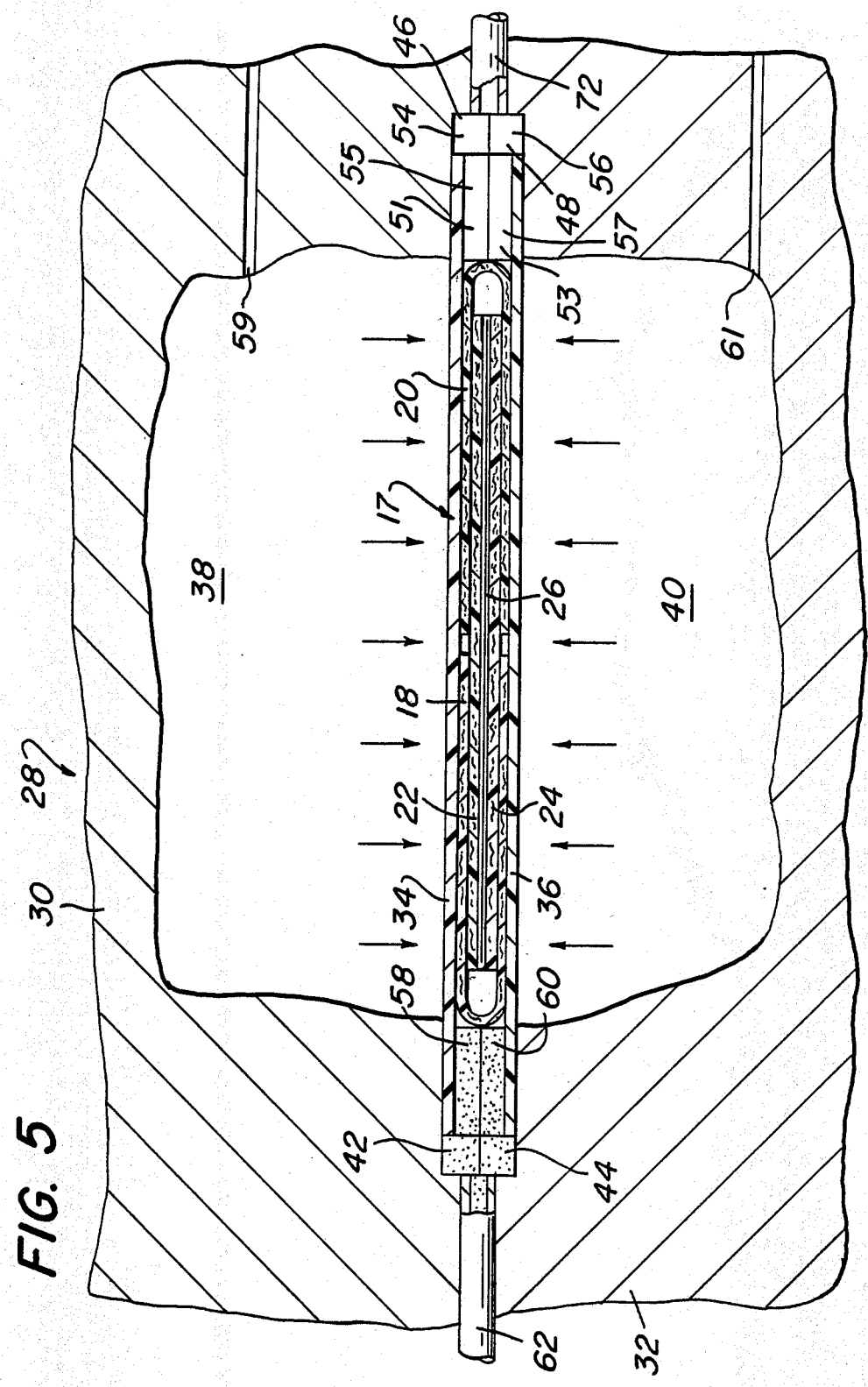
FIGS. 5, 6 and 7 illustrate steps in the formation of a fiber reinforced structure with the mold pieces closed in accordance with the present invention.

FIG. 4 illustrates the mold 28 in the open position and FIG. 5 illustrates the mold 28 in a closed position.

Referring to FIG. 5, after the mold pieces 30 and 32 are closed, pressure is applied from a source, which may be a gas provided by cut-out portions through openings 59 and 61 in the mold pieces 30 and 32, respectively. Pressure is applied behind the flexible sheets 34 and 36, as illustrated by the directions of the arrows. The sources of pressure are conventional and therefore not illustrated in detail.

After the mold pieces 30 and 32 are closed and pressure is applied to the sheets 34 and 36, resin is pumped from a source through a tubular member 62, through an opening provided by cut-away portions 58 and 60, respectively into the fiber pieces. As the resin is injected into the fiber pieces, air is vented through an opening provided by cut-away portions 51 and 53. The air is ultimately vented from vent grooves 54 and 56 through a tubular member 72. The various steps of impregnating the fiber reinforced material and venting the air from the fiber pieces within the mold are conventional and generally described in the aforementioned co-pending patent application.

Figure 6:
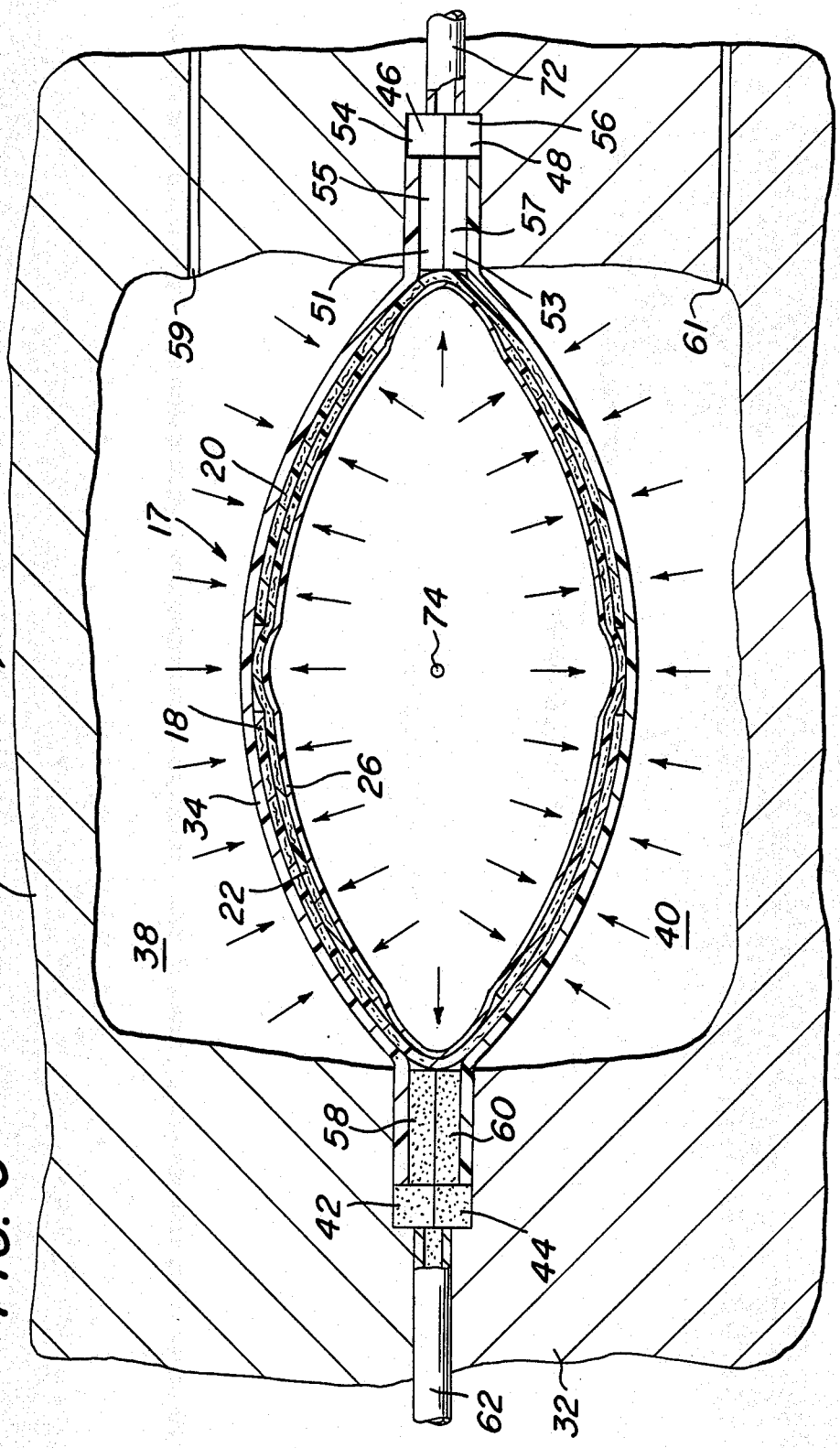

After the resin has been applied to the fiber material, pressure in the cavity 38 and 40 is gradually reduced and the inflatable bladder 26 is simultaneously inflated as illustrated in FIG. 6.

Referring to FIG. 6, gas is applied to the inflatable bladder 26 through vent 74. The source of the pressure may be any suitable gas and the pressure is illustrated by the arrows extending against the inner surfaces of the bladder 26. As the pressure inside the bladder 26 increases, the pressure against the silicon sheets 34 and 36 bladder decreases. The fiber pieces move with the member 26 and the area of the pieces may be considered as expanding. The multiple pieces of fiber 18, 20, 22 and 24 permit the pieces to slide on each other during the expansion of the bladder 26.

Figure 7:
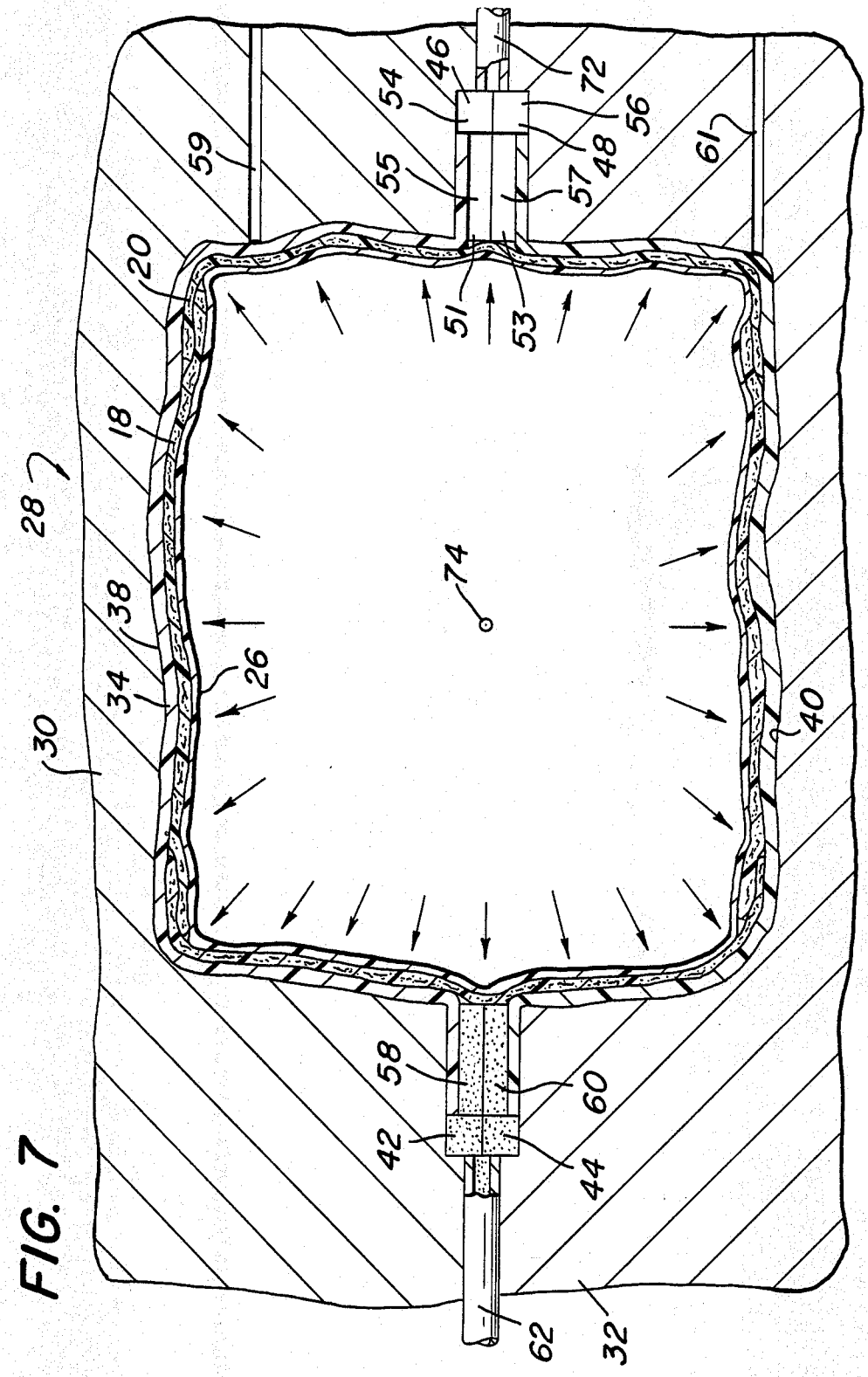

Referring to FIG. 7, the bladder 26 continues to expand until the fiber pieces and silicone sheets are stopped by the interior surfaces of the cavities 38 and 40. At this point the pressure against the bladder 26 is maximum with little or no pressure being applied to the outer silicon bladder or bladders.

The oversize bladder 26 which may be of the shape illustrated in FIGS. 1 or 2 or any other desirable shape having excess material and capable of being flat when inserted into a mold. The inner bladder expands to conform to the surfaces of the cavities in the mold pieces. After the surfaces of sheets 34 and 36 are in contact with the inner surfaces of the mold pieces 30 and 32 the shaped fiber is cured to form a solid integral hollow structure.

The use of multiple pieces of fiber material makes it possible to form the fiber structure without preforming the fiber against the inner surfaces of the mold.

As a result of the elimination of the need for preforming the fiber reinforced material and the bladder, much time is saved in forming the final hollow fiber reinforced products. This results in decreased cost and permits relatively high rate of production of parts.

The specific types of transducers, control valves and the like for increasing the pressures in the bladder as the pressure against the silicon sheets are decreased, not illustrated in detail because they are known and only incidentally related to the present invention.

As illustrated the silicon sheets with the hold-down members may take different forms. For example in some cases only a single sheet or bag arrangement may be used with pressure applied to the bag and fiber pieces.

What is claimed is:

1. A method of forming a hollow fiber structure comprising the steps of:
    a. providing a two-piece mold in open positions having inner cavity surfaces conforming to said fiber structure to be formed;
    b. providing a flexible expandable member
    c. placing fiber material around said expandable member;
    d. inserting expandable means in said mold and securing at the mold surfaces outside the mold cavity;
    e. inserting said fiber material with said expandable member into said mold in proximity to said expandable means to position said fiber material between said expandable member and said expandable means;
    f. closing said mold;
    g. applying pressure to force said expandable means against said fiber reinforced material;
    h. injecting resin into said fiber material,
    i. decreasing the pressure applied to said expandable means and applying pressure to expand said expandable member and move said fiber material to conform to said inner cavity surfaces of said mold, and
    j. curing said fiber material to form said hollow fiber structure.

2. A method as set forth in claim 1 wherein said fiber material comprises a plurality of pieces disposed to slide on each other and move when said flexible expandable member is expanding with said pieces of fiber material being maintained around said flexible expandable member.

3. A method as set forth in claim 2 wherein said expandable member and said pieces of fiber material are placed in said mold in flat conditions.

4. A method as set forth in claim 3 wherein said expandable means comprise a pair of sheets disposed on opposite sides of the flat pieces of fiber material inside of said open mold.

5. A method as set forth in claim 4 wherein said inner surfaces of said mold include cavities and hold down elements are provided to hold down said sheets to cover said cavities when said mold is open.

6. A method as set forth in claim 5 wherein said two pieces of said mold include openings therein connecting sources of pressure to said cavities.

7. A method as set forth in claim 1 wherein said flexible expandable member includes folded material which unfolds into said cavities when said flexible expandable member is inflated by a source of gaseous pressure.

8. A method as set forth in claim 7 wherein a resin channel is provided to receive resin injected into said fiber material.

9. A method as set forth in claim 8 wherein a vent channel is provided to vent air from said fiber material as it receives resin from said resin channel.

10. A method as set forth in claim 9 wherein said hold down elements and said sheets provide a seal therebetween when said mold pieces are closed.

* * * * *